US008479053B2

(12) United States Patent
Rajwar et al.

(10) Patent No.: US 8,479,053 B2
(45) Date of Patent: Jul. 2, 2013

(54) PROCESSOR WITH LAST BRANCH RECORD REGISTER STORING TRANSACTION INDICATOR

(75) Inventors: Ravi Rajwar, Portland, OR (US); Peter Lachner, Heroldstatt (DE); Laura A. Knauth, Portland, OR (US); Konrad K. Lai, Vancouver, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 12/845,554

(22) Filed: Jul. 28, 2010

(65) Prior Publication Data

US 2012/0030518 A1 Feb. 2, 2012

(51) Int. Cl.
*G06F 11/36* (2006.01)
(52) U.S. Cl.
USPC .............. 714/38.13; 712/233; 714/E11.208
(58) Field of Classification Search
None
See application file for complete search history.

(56) References Cited

U.S. PATENT DOCUMENTS

| 6,658,557 | B1 | 12/2003 | McCoy et al. |
| 8,296,749 | B2* | 10/2012 | Zhao et al. ............... 717/158 |
| 2007/0162728 | A1* | 7/2007 | Yokoi ........................ 712/240 |
| 2007/0240158 | A1 | 10/2007 | Chaudhry et al. |
| 2007/0260942 | A1 | 11/2007 | Rajwar et al. |
| 2008/0005504 | A1 | 1/2008 | Barnes et al. |
| 2008/0065864 | A1 | 3/2008 | Akkary et al. |
| 2009/0271597 | A1 | 10/2009 | Kuesel et al. |

OTHER PUBLICATIONS

Patent Cooperation Treaty, Notification of Transmittal of the International Search Report and the Written Opinion, mailed on Apr. 6, 2012 in International application No. PCT/US2011/045797.
Intel 64 and IA-32 Architectures Software Developer's Manual, vol. 3B: System Programming Guide, Part 2, Jun. 2009, 30 pgs.

* cited by examiner

*Primary Examiner* — Kenneth Kim
(74) *Attorney, Agent, or Firm* — Trop, Pruner & Hu, P.C.

(57) ABSTRACT

In one embodiment, a processor includes an execution unit and at least one last branch record (LBR) register to store address information of a branch taken during program execution. This register may further store a transaction indicator to indicate whether the branch was taken during a transactional memory (TM) transaction. This register may further store an abort indicator to indicate whether the branch was caused by a transaction abort. Other embodiments are described and claimed.

22 Claims, 6 Drawing Sheets

PROCESSOR WITH LAST BRANCH RECORD REGISTER STORING TRANSACTION INDICATOR

BACKGROUND

As technology advances, computer systems include greater numbers of processors, in the form of multiprocessor systems, e.g., via one or more multi-core processors that can execute multiple threads concurrently. Generally, before a thread accesses a shared resource, it may acquire a lock on the shared resource. In situations where the shared resource is a data structure stored in memory, all threads that are attempting to access the same resource may serialize the execution of their operations in light of mutual exclusivity provided by the locking mechanism. This may be detrimental to system performance and may cause program failures, e.g., due to deadlocks or other unwanted behavior.

The ever increasing number of cores and logical processors in a system enables more software threads to be executed. However, the increase in the number of software threads that may be executed simultaneously has created problems with synchronizing data shared among the software threads. One common solution to accessing shared data in multiple core or multiple logical processor systems uses locks to guarantee mutual exclusion across multiple accesses to shared data. However, the ever increasing ability to execute multiple software threads potentially results in false contention and a serialization of execution.

To reduce performance loss resulting from utilization of locking mechanisms, some computer systems may use transactional memory (TM). Transactional memory generally refers to a synchronization model that allows multiple threads to concurrently access a shared resource without utilizing a locking mechanism.

Often transactional execution may include speculatively executing groups of micro-operations, operations, or instructions. Current TM systems include hardware TM systems in which processor hardware is used to perform transactions, software TM systems in which transactions are implemented in software and hybrid TM systems in which both hardware and software can be used to execute a transaction. Typically, a hardware TM system can be most efficient, but if a transaction becomes too large, e.g., overflows a hardware memory, then the transaction is usually restarted. Here, the time taken to execute the transaction up to the overflow is potentially squandered.

Processors include various hardware and can also provide hardware for testing, debug and other operations. For example, various registers can be provided in a processor for performing processor checkpointing, exception reporting, branch recording and so forth. However, such performance monitoring hardware is generally not used in the context of transactional memory.

DETAILED DESCRIPTION

In various embodiments, branch information obtained during execution of a program can be recorded and then used for purposes of profiling, debugging and/or optimization of transactional memory transactions. In this way, improved transactional memory operation and code can be realized. In various embodiments, the information included in such registers may include last branch information, in which information regarding branches taken during program execution can be recorded. In addition to the identification of such branches, information regarding execution of a pending transaction of a transactional memory can also be recorded. Using this information, debugging and other operations can be realized for transactional memory transactions.

Transactional execution usually includes grouping a plurality of instructions or operations into a transaction, atomic section, or critical section of code. In some cases, the term instruction refers to a macro-instruction which is made up of a plurality of operations, while in other cases an instruction can refer to a smaller operation, e.g., a micro-operation (uop). There are commonly two ways to identify transactions. The first example includes demarcating the transaction in software. Here, some software demarcation is included in code to identify a transaction. In another embodiment, which may be implemented in conjunction with the foregoing software demarcation, transactions are grouped by hardware or recognized by instructions indicating a beginning of a transaction and an end of a transaction.

In a processor, a transaction is executed either speculatively or non-speculatively. In the second case, a grouping of instructions is executed with some form of lock or guaranteed valid access to memory locations to be accessed. In the alternative, speculative execution of a transaction is more common, where a transaction is speculatively executed and committed upon the end of the transaction. A pendency of a transaction, as used herein, refers to a transaction that has begun execution and has not been committed or aborted, i.e., pending.

Typically, during speculative execution of a transaction, updates to memory are not made globally visible until the transaction is committed. While the transaction is still pending, locations loaded from and written to a memory are tracked. Upon successful validation of those memory locations, the transaction is committed and updates made during the transaction are made globally visible. However, if the transaction is invalidated during its pendency, the transaction is restarted without making the updates globally visible.

In various embodiments last branch recording facilities may be provided in a processor. Such facilities may store branch records in a set of registers, which one embodiment may be machine or model specific registers (MSRs). For example, a processor may include a last branch record (LBR) stack of MSRs for storing information regarding the most recently taken branches. A branch record includes a pair of registers, one of which to store a branch-from instruction address and a branch-to instruction address which may be linear addresses, in one embodiment. In some implementations, the registers may be automatically read, while in other embodiments, a control signal may cause the stack to send branch records as branch trace messages (BTMs) to a selected destination location.

Note that operation of LBR registers can be controlled to be enabled or disabled. For example, an LBR flag may be present in a debug control MSR to enable the processor to automatically record branch records for taken branches. Note that in some embodiments, in addition to LBRs, information regarding interrupts and exceptions can also be recorded in the LBR registers, although in other embodiments separate recording facilities may be provided for such situations.

In one embodiment, a debugger can use addresses in a LBR stack to enable a backward trace from the manifestation of a particular bug toward its source.

Note that the number of MSRs in the LBR stack can vary in different embodiments. For example, in different implementations, the size of the LBR stack may be 4, 8 or 16, although the scope of the present invention is not limited in this regard. As described above, last branch recording mechanisms may track not only branch instructions (like jumps, loops and call instructions), but also other operations that cause a change in the instruction pointer (like external interrupts, traps and faults).

Figure 1:
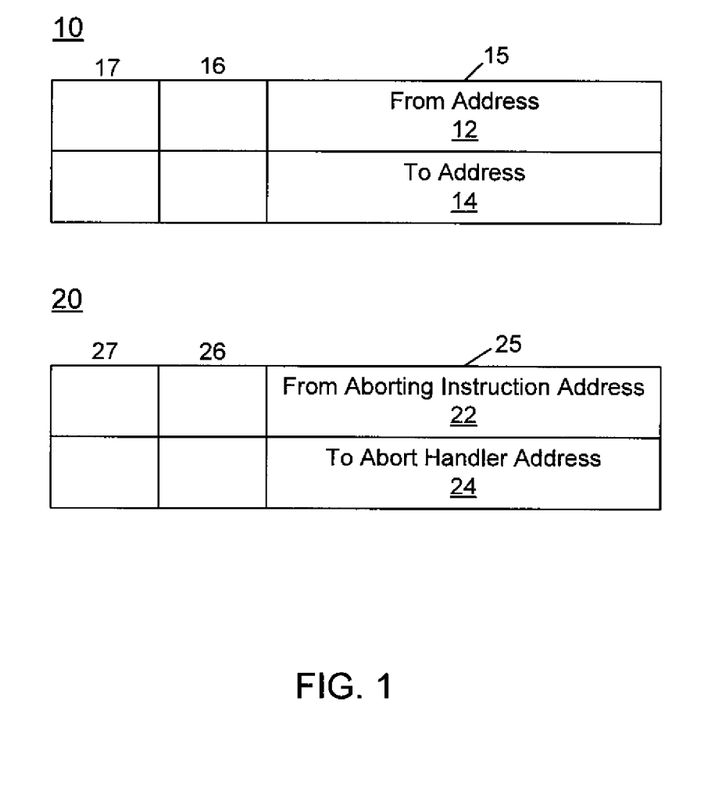
FIG. 1 is a block diagram of last branch register pairs in accordance with an embodiment of the present invention.

Referring now to FIG. 1, shown is a block diagram of a LBR register pair in accordance with an embodiment of the present invention. As shown in FIG. 1, register pair 10 may include two MSRs, namely a first MSR 12 and a second MSR 14. As seen, MSR 12 may store a source address. That is, this register may store a source address of a recent branch, namely the "from" address at which a branch occurs. In turn, register 14 may store a destination address, namely a "to" address to which control is passed by the branch. In addition to an address field 15 that stores an instruction pointer address, additional fields may be present in these registers. Specifically, in the embodiment of FIG. 1 a transaction indicator 16 and an abort indicator 17 may be associated with each register. More specifically, transaction indicator 16 may be set when the corresponding branch occurs during execution of a transaction. In turn, abort indicator 17 may be set for a first branch that occurs after a transaction is aborted. More precisely, an abort causes a jump to an abort handler. This jump is then recorded in the LBR with the abort indicator set. This abort indicator is used to distinguish this branch from other branches. Further details regarding storage of information regarding an aborting event is discussed below. In this way, information regarding the execution of a transaction in which the branch occurs can be recorded. As will be discussed further below, using this information, a greater understanding of the execution of a transaction can be gained, potentially improving execution, e.g., via optimizations or so forth.

As described above, in addition to register pairs for branch information, information regarding an aborting event can be recorded. Specifically, as shown in FIG. 1, an additional register pair 20 may include information regarding an instruction that causes an abort to occur to a pending transaction. Specifically, register 22 may store an instruction pointer for the instruction that caused the transaction to abort. The second register of the pair, namely register 24, may store a destination address which can be the address of an abort handler corresponding to code, logic or so forth to enable recovery from the abort. While shown with only these two register pairs in the embodiment of FIG. 1, understand that a LBR stack may include many more pairs. In addition, the structure, arrangement and information included in the LBRs may be different in different embodiments. For example, in some embodiments the LBR storage may be implemented as a circular array.

Note that additional information may be present in the LBR registers. For example, in some embodiments a prediction indicator may be provided that, when set indicates that the branch taken was predicted correctly. Otherwise, the indicator may be cleared to indicate that the branch was mispredicted. Of course additional indicators and other information may be provided in these registers.

In some embodiments a last branch record top-of-stack (TOS) pointer may store a pointer to the MSR in the LBR stack that contains the most recent branch, interrupt, or exception recorded.

As will be described below, in some embodiments a debug store (DS) mechanism may store BTMs in a branch trace store (BTS) which may be part of a given portion of a memory hierarchy such as a hardware buffer, cache, or system memory. In one embodiment, when the BTS flag in the debug control MSR is set, a branch record is stored in the BTS buffer in the DS save area whenever a taken branch, interrupt, or exception is detected.

In some embodiments, filtering of last branch records can be realized via a LBR select register that may provide fields to specify the conditions of subsets of branches that will not be captured in the LBR. For example, this register may include fields to filter branches occurring in predetermined privilege levels or so forth.

Thus in one embodiment, each branch record includes two linear addresses, which represent the "from" and "to" instruction pointers for a branch, interrupt, or exception. The contents of the from and to addresses may differ, depending on the source of the branch. Where the record is for a taken branch, the "from" address is the address of the branch instruction and the "to" address is the target instruction of the branch. Where the record is for an interrupt, the "from" address is the return instruction pointer (RIP) saved for the interrupt and the "to" address is the address of the first instruction in the interrupt handler routine. The RIP is the linear address of the next instruction to be executed upon returning from the interrupt handler. Where the record is for an exception, the "from" address is the linear address of the instruction that caused the exception to be generated and the "to" address is the address of the first instruction in the exception handler routine.

Figure 2:
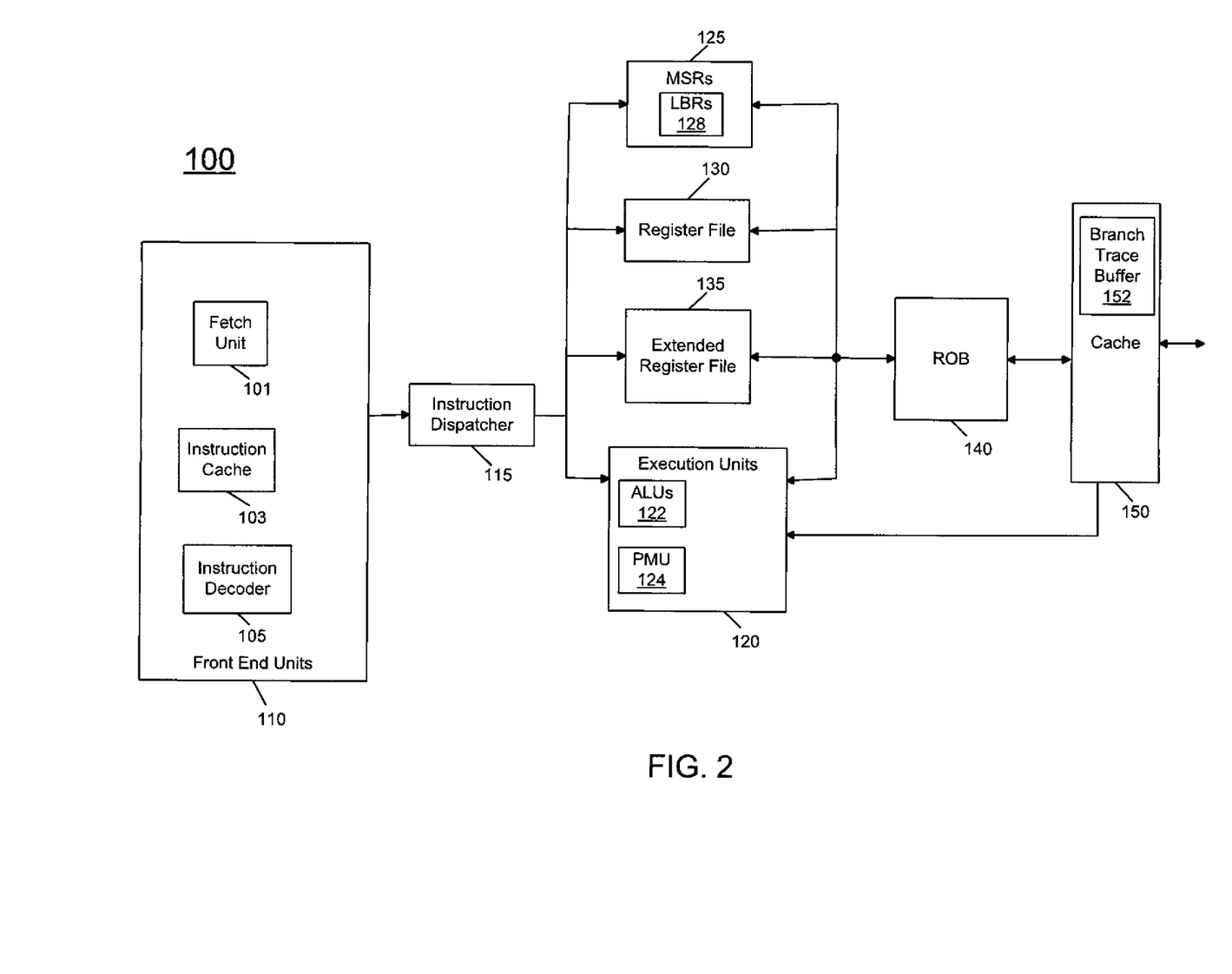
FIG. 2 is a block diagram of a processor core in accordance with one embodiment of the present invention.

Referring now to FIG. 2, shown is a block diagram of a processor core in accordance with one embodiment of the present invention. As shown in FIG. 2, processor core 100 may be a multi-stage pipelined out-of-order processor. Processor core 100 is shown with a relatively simplified view in FIG. 2 to illustrate various features used in connection with branch record reporting in accordance with an embodiment of the present invention. Further, understand that as described above a processor may or may not provide hardware support for TM transactions. For sake of illustration assume that core 100 includes such hardware support. However, in some embodiments using transactional status information stored in LBRs, even in the absence of such hardware support, analysis of transaction execution can occur. In this way, an understanding of what branches occur during a transaction, whether a branch causes a transaction to abort or so forth, can be obtained. Then debug, optimization, profiling or other activities can occur with this information.

As shown in FIG. 2, core 100 includes front end units 110, which may be used to fetch instructions to be executed and prepare them for use later in the processor. For example, front end units 110 may include a fetch unit 101, an instruction cache 103, and an instruction decoder 105. In some implementations, front end units 110 may further include a trace cache, along with microcode storage as well as a micro-operation storage. Fetch unit 101 may fetch macro-instructions, e.g., from memory or instruction cache 103, and feed them to instruction decoder 105 to decode them into primitives, i.e., micro-operations for execution by the processor.

Coupled between front end units 110 and execution units 120 is an instruction dispatcher 115 which can be implemented as out-of-order logic in out-of-order implementations to receive the micro-instructions and prepare them for execution. More specifically instruction dispatcher 115 may include various buffers to allocate various resources needed for execution, as well as to provide renaming of logical registers onto storage locations within various register files such as register file 130 and extended register file 135. Register file 130 may include separate register files for integer and floating point operations. Extended register file 135 may provide storage for vector-sized units, e.g., 256 or 512 bits per register.

As further seen in FIG. 2, processor 100 may include a set of MSRs 125. As discussed above, various types of model specific information may be stored in such registers. In the embodiment of FIG. 2, shown is a set of LBRs 128 which as discussed above may store information regarding branches taken during execution of code. These or similar registers may further include information regarding other execution occurrences such as interrupts, traps, exceptions and so forth.

Various resources may be present in execution units 120, including, for example, various integer, floating point, and single instruction multiple data (SIMD) logic units, among other specialized hardware. For example, such execution units may include one or more arithmetic logic units (ALUs) 122. In addition, execution units may further include a performance monitoring unit (PMU) 124. In various embodiments, PMU 124 may be used to control obtaining of various information, e.g., profiling counters, information in MSRs and so forth. In particular implementations here, PMU 124 or other such logic may be used to control recording of information, including information regarding transaction execution in LBR 128 and to further obtain such information for further use. Results may be provided to retirement logic, namely a reorder buffer (ROB) 140. More specifically, ROB 140 may include various arrays and logic to receive information associated with instructions that are executed. This information is then examined by ROB 140 to determine whether the instructions can be validly retired and result data committed to the architectural state of the processor, or whether one or more exceptions occurred that prevent a proper retirement of the instructions. Of course, ROB 140 may handle other operations associated with retirement.

As shown in FIG. 2, ROB 140 is coupled to a cache 150 which, in one embodiment may be a low level cache (e.g., an L1 cache) although the scope of the present invention is not limited in this regard. As seen, cache 150 in one embodiment may include a branch trace buffer 152 that may store branch information, e.g., received from LBRs 128. For example, PMU 124 may control the creation and sending of branch target messages from LBR 128 to branch trace buffer 152. From here, the information may be accessed, e.g., via a profiler optimizer or so forth to enable analysis of information regarding transaction execution in accordance with an embodiment of the present invention. Also, execution units 120 can be directly coupled to cache 150. While shown with this high level in the embodiment of FIG. 2, understand the scope of the present invention is not limited in this regard.

Figure 3:
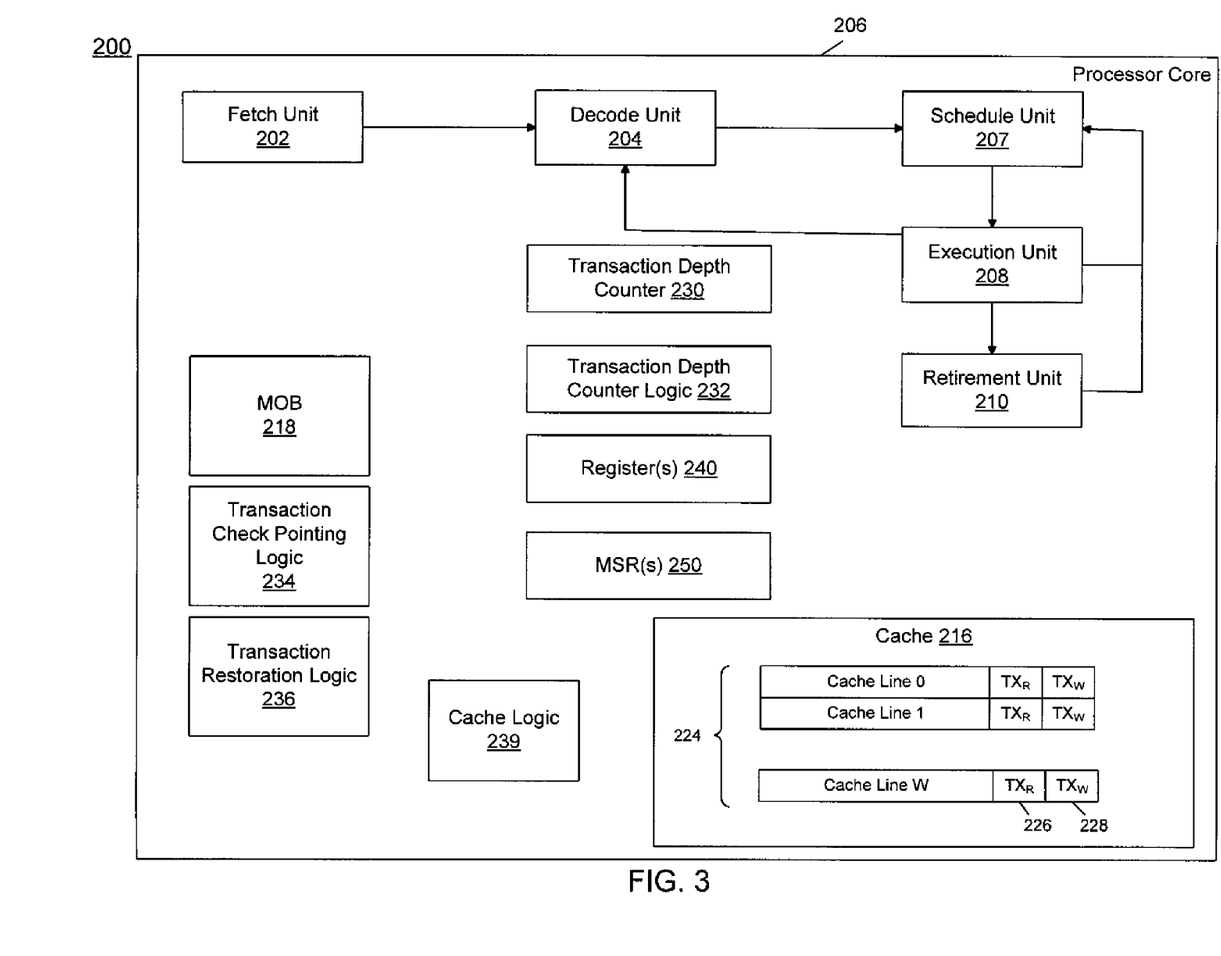
FIG. 3 is a block diagram of a processor core in accordance with another embodiment of the present invention.

FIG. 3 is a block diagram of a processor core in accordance with an embodiment of the present invention that may execute transactional memory access requests in hardware. Using a core such as core 206, transaction status indicators for LBRs may be set using information obtained from hardware of the core. As shown in FIG. 3, the processor core 206 may include a fetch unit 202 to fetch instructions for execution by the core 206. Core 206 may also include a decode unit 204 to decode the fetched instruction. For instance, the decode unit 204 may decode the fetched instruction into a plurality of uops.

Additionally, the core 206 may include a schedule unit 207. Schedule unit 207 may perform various operations associated with storing decoded instructions (e.g., received from the decode unit 204) until the instructions are ready for dispatch, e.g., until all source values of a decoded instruction become available. In one embodiment, schedule unit 207 may schedule and/or issue (or dispatch) decoded instructions to one or more execution units 208 for execution. Execution unit 208 may include a memory execution unit, an integer execution unit, a floating-point execution unit, or other execution units. A retirement unit 210 may retire executed instructions after they are committed. In an embodiment, retirement of the executed instructions may result in processor state being committed from the execution of the instructions, physical registers used by the instructions being de-allocated, etc.

A memory order buffer (MOB) 218 may include a load buffer, a store buffer and logic to store pending memory operations that have not loaded or written back to a main memory. In various embodiments, a core may include a local cache, e.g., a private cache such as cache 216 that may include one or more cache lines 224 (e.g., cache lines 0 through W and that is managed by cache logic 239. In an embodiment, each line of cache 216 may include a transaction read bit 226 and/or a transaction write bit 228 for each thread executing on core 206. Bits 226 and 228 may be set or cleared to indicate (load and/or store) access to the corresponding cache line by a transactional memory access request. Note that while in the embodiment of FIG. 3 each cache line 224 is shown as having a respective bit 226 and 228, other configurations are possible. For example, a transaction read bit 226 (or transaction write bit 228) may correspond to a select portion of the cache 216, such as a cache block or other portion of the cache 216. Also, the bits 226 and/or 228 may be stored in locations other than the cache 216. Thus information in such hardware can be used to set various indicators for LBRs.

To aid in executing TM operations, core 206 may include a transaction depth counter 230 to store a value corresponding to the number of transactional memory access requests that remain uncommitted. For example, the value stored in counter 230 may indicate the nesting depth of multiple transactional memory access requests that correspond to the same thread. In one instance, multiple transactional memory access requests may result when one transaction is initiated inside a pending transaction (such as via a library call or other nested procedure). Counter 230 may be implemented as any type of a storage device such as a hardware register or a variable stored in a memory (e.g., system memory or cache 216). Core 206 may also include a transaction depth counter logic 232 to update the value stored in the counter 230. Core 206 may include a transaction check pointing logic 234 to check point (or store) the state of various components of the core 206 and a transaction restoration logic 236 to restore the state of various components of the core 206, e.g., on abort of a given transaction. Additionally, core 206 may include one or more additional registers 240 that correspond to various transactional memory access requests, such as a transaction status and control register (TXSR), a transaction instruction pointer (TXIP) (e.g., that may be an instruction pointer to an instruction at the beginning (or immediately preceding) the corresponding transaction), and/or transaction stack pointer (TXSP) (e.g., that may be a stack pointer to the head of a stack that stores various states of one or more components of core 206). Further, to enable capture of transaction information for branches, MSRs 250 may also be present which may store, in addition to branch information, transaction status information such as a transaction present indicator and a transaction abort indicator.

Figure 4:
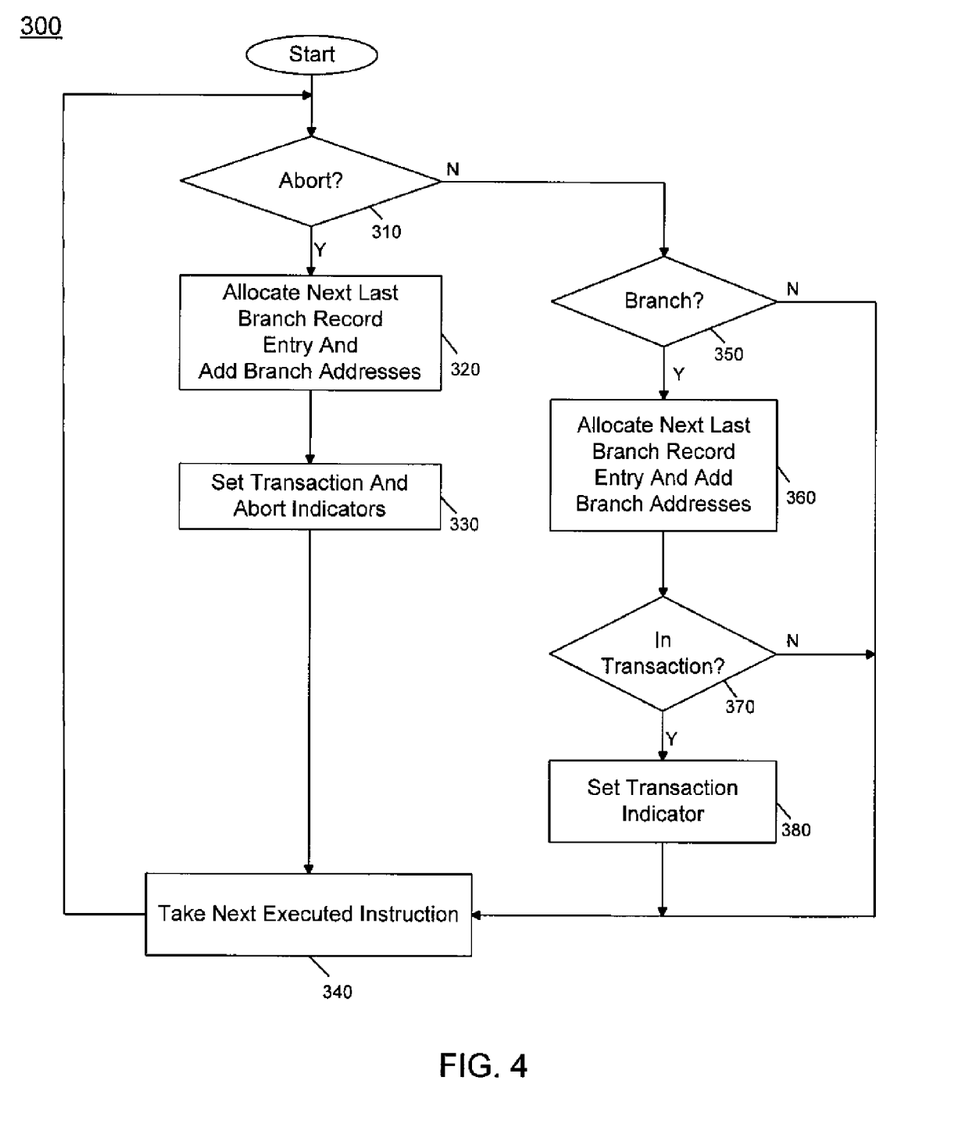
FIG. 4 is a flow diagram of a method for generating branch records in accordance with one embodiment of the present invention.

Referring now to FIG. 4, shown is a flow diagram of a method in accordance with one embodiment of the present invention. In the embodiment of FIG. 4, method 300 may be used to populate information in a LBR record register in accordance with an embodiment of the present invention. For example, method 300 may be implemented using processor logic such as logic of a PMU or so forth. As seen, method 300 may begin by determining whether an abort occurs during program execution (diamond 310). This determination of an abort may occur by analysis of the in-transaction internal state, which is set to false either when a transaction passes an end-of-transaction marker (which can be an instruction) or when a transaction aborts. Note that an abort is not a state, but an event that causes a jump from wherever the current execution stream is to the abort handler location.

If an abort is determined to have occurred at diamond 310, control passes to block 320, where a next LBR entry may be allocated. As discussed above, different types of branch record entries may be possible. For example, a single register may include destination only information, a register pair may store source and destination information, or so forth. Thus in some embodiments multiple branch addresses may be added to this entry. Specifically, a source and destination address may be stored (note that here the destination address may be for the abort handler). In addition as shown at block 330, transaction and abort indicators for this entry may also be set, thus indicating that an abort of a pending transaction has occurred.

Control next passes to block 340, where the next executed instruction may be taken. As seen, this causes method 300 to begin again with regard to a determination of an abort, as described above. Instead this time, assume that at diamond 310 it is determined that an abort has not occurred, control instead passes to diamond 350, where it may be determined whether a branch has occurred. As discussed above such branches may occur for given instruction types such as jumps, calls, or so forth. If no branch occurs, the method concludes with regard to that instruction and control passes to block 340 to the next executed instruction.

Referring still to FIG. 4, if instead it is determined that a given instruction is a branch instruction, various information may be stored. Specifically as shown in FIG. 4, at block 360 a next LBR entry may be allocated and branch address information stored into the entry.

Next, it may be determined whether the branch has occurred during a transaction (diamond 370). For example, in one embodiment an internal processor state "in-transaction" may be set to true when an instruction that signifies the start of a transaction is executed. If not, control passes to block 340 discussed above (also understand that here both the transaction and abort indicators may be cleared).

If instead at diamond 370 it is determined that the branch has occurred during execution of a transaction, control passes to block 380 where a transaction indicator of the LBR entry may be set to indicate that the branch occurred during transaction execution. Then control passes to block 340, discussed above. While shown with this particular implementation in the embodiment of FIG. 4, understand the scope of the present invention is not limited in this regard.

Figure 5:
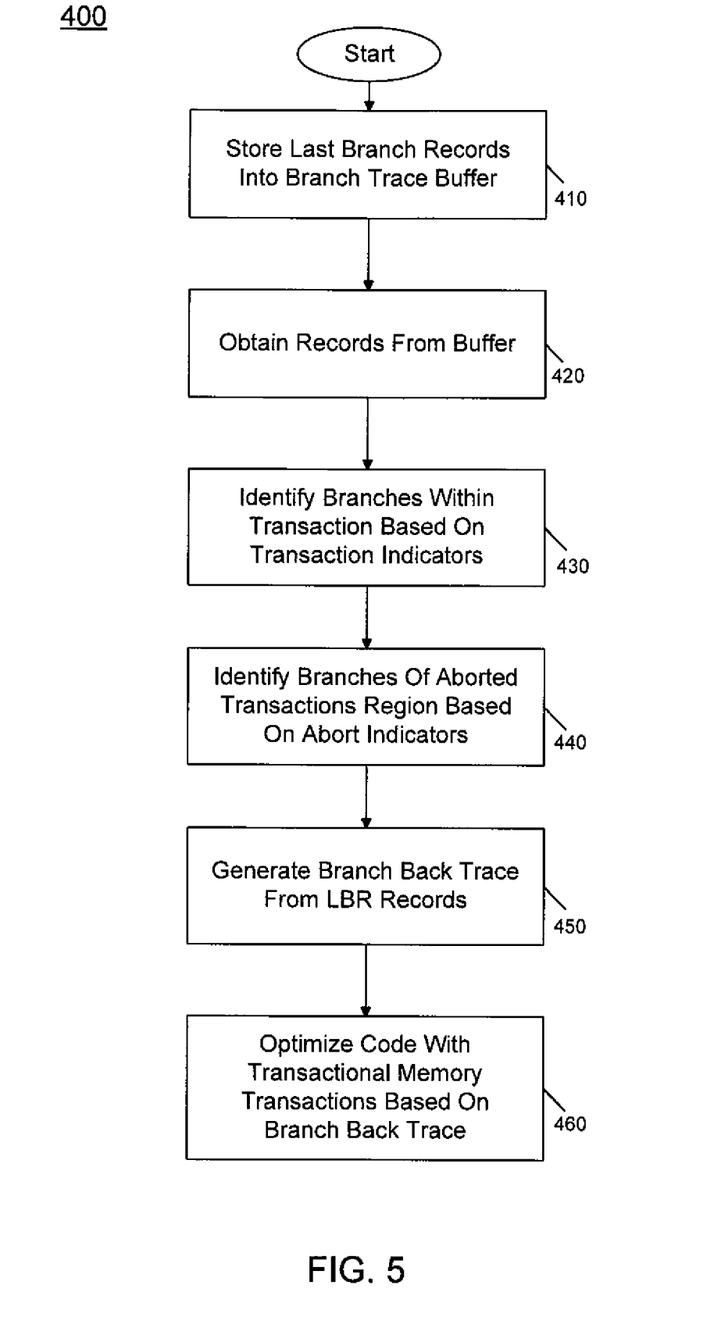
FIG. 5 is a flow diagram of a method for using branch records in accordance with an embodiment of the present invention.

Referring now to FIG. 5, shown is a flow diagram of a method for using branch records in accordance with an embodiment of the present invention. As shown in FIG. 5, method 400 may be implemented by various logic such as a debugger, analyzer, optimizer or so forth. Method 400 may begin by storing last branch records into a branch trace buffer (block 410). For example, in a given implementation a limited number of MSR pairs may be present to store last branch records. Accordingly, when these pairs have been filled, responsive to a control bit of a control register or so forth, logic such as a PMU or dedicated LBR logic may generate BTMs to send this information to the buffer. Then, these records may be obtained from the buffer (block 420). For example, an optimizer or other such logic can obtain these records.

Still referring to FIG. 5, based on the information in the records, branches that occur within the context of one or more transactions can be identified based on the transaction indicators. For example, assume that a first entry has a cleared transaction indicator and that a following entry has a set transaction indicator, this means that this second entry is the first branch inside the transaction region. Assume instead that the first entry has a set transaction indicator and the second entry has a clear transaction indicator, this means that the first entry was the last branch inside a transaction region. Assume yet again that all entries in a set of records under analysis have a cleared transaction indicator, this indicates that none of the branches occurred during transaction execution, while instead if all such transaction indicators are set, this indicates that all branches occurred in the context of a TM transaction.

Still referring to FIG. 5, next at block 440, any branches that are identified as part of an aborted transaction region can be identified. Specifically, based on a combination of the transaction indicators and abort indicators, such information can be determined. Specifically, a first entry having its abort indicator set indicates that the abort occurred prior to that LBR entry. Accordingly from this information, a branch back trace can be generated. This information can be used, for example to optimize the code (block 450). Assume that a code section includes a branch that causes the transaction to abort, an optimizer may cause this code to be modified to cause that branch not to be taken or to modify the branch to avoid a transaction abort in a future execution of the code segment. Of course other uses of this transaction status information are possible such as understanding if and at which instruction a transaction aborted inside a debugger tool.

Due to the nature of transactions, on an abort no architectural visible state is exposed to the outside world. This transaction information allows reconstruction of otherwise invisible and unknown program flow up to the aborting location. Thus embodiments enable use of information stored in the LBR registers to be used in generation of an execution back trace. This execution back trace can then be used, both online and offline. For example, the execution back trace can be used by a debugger tool to allow inspection of code flow inside the TM transaction. Or an offline analysis tool can use the execution back trace to allow a post mortem code flow inspection. While shown with this particular implementation in the embodiment of FIG. 5, understand the scope of the present invention is not limited in this regard.

Figure 6:
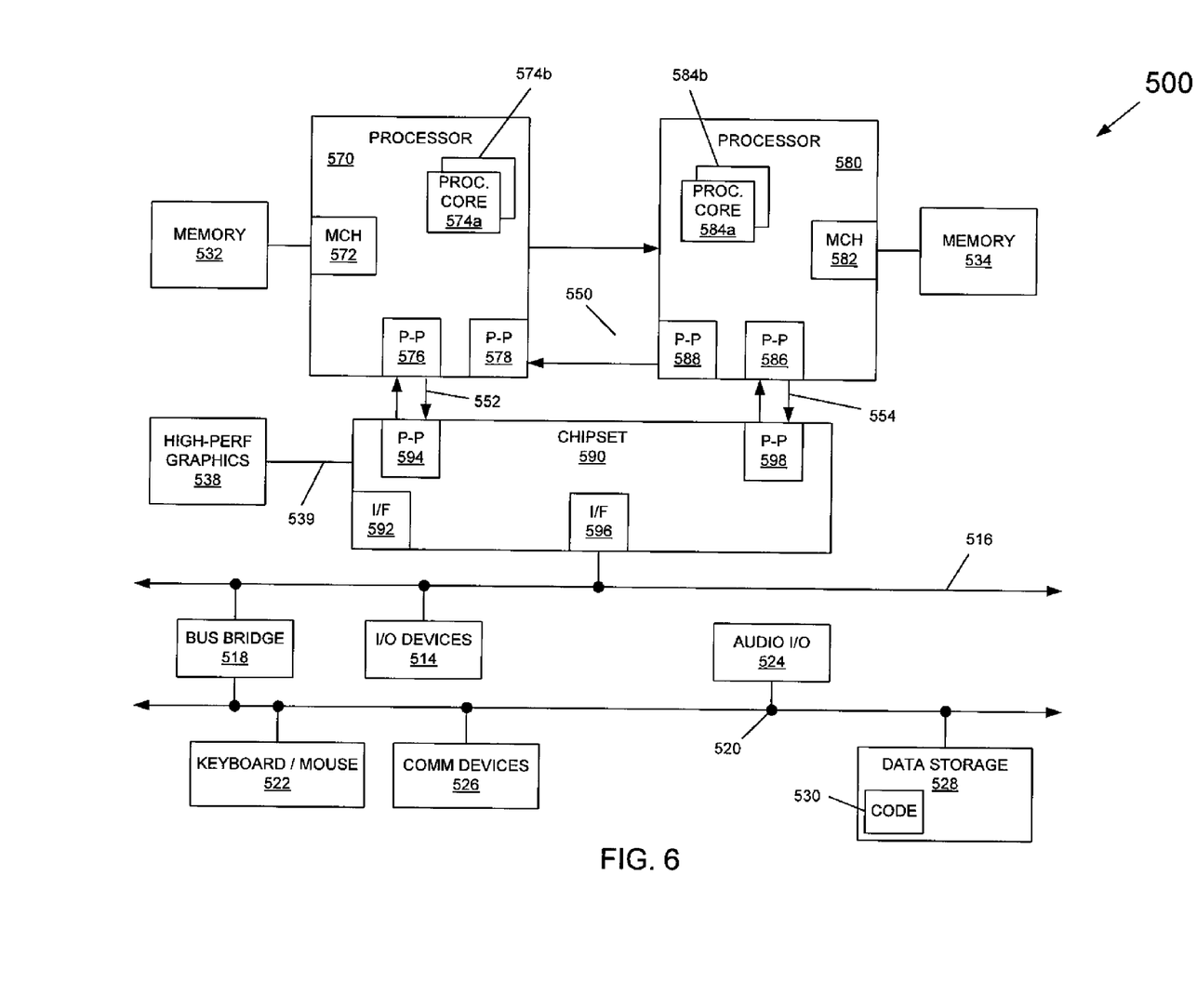
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574*a* and 574*b* and processor cores 584*a* and 584*b*), although potentially many more cores may be present in the processors. Such cores may include LBR registers in accordance with an embodiment of the present invention to enable analysis of branches occurring within TM transactions.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor including an execution unit and at least one last branch record (LBR) register to store at least one of source and destination address information of a branch taken during program execution, the at least one LBR register further including a transaction indicator to indicate whether the branch was taken during a transactional memory (TM) transaction.

2. The apparatus of claim 1, wherein the at least one LBR register is to further store an abort indicator to indicate whether an abort of the TM transaction occurred prior to when the branch was taken.

3. The apparatus of claim 2, further comprising logic to store the at least one of source and destination address information, the transaction indicator and the abort indicator into the at least one LBR register.

4. The apparatus of claim 1, further comprising an abort transaction register to store first address information of an instruction that causes the TM transaction to abort, and second address information of a handler to receive control responsive to the abort.

5. The apparatus of claim 1, further comprising a branch trace buffer (BTB) to store information from the at least one LBR register, wherein the at least one LBR register includes a plurality of LBR register pairs.

6. The apparatus of claim 5, further comprising an optimizer to use an execution back trace for the TM transaction obtained based at least in part on the information stored in the BTB.

7. The apparatus of claim 1, further comprising a debug tool to allow inspection of a code flow inside the TM transaction via use of an execution back trace of the TM transaction based on information stored in the at least one LBR register.

8. The apparatus of claim 1, further comprising an analysis tool to enable a post mortem inspection of a code flow of the TM transaction via use of an execution back trace of the TM transaction based on information stored in the at least one LBR register.

9. A method comprising:
inserting branch address information into a last branch record (LBR) entry of a processor when a branch is taken during program execution;
writing a transaction indicator of the LBR entry if the branch is taken during execution of a transactional memory (TM) transaction, and otherwise not writing the transaction indicator; and
writing an abort indicator of the LBR entry if the branch occurs after an abort of the TM transaction, and otherwise not writing the abort indicator.

10. The method of claim 9, further comprising using transaction state information of the processor to determine whether the branch occurs within the TM transaction.

11. The method of claim 9, further comprising storing information from a plurality of LBR entries into a branch trace buffer of a cache memory of the processor.

12. The method of claim 11, further comprising identifying one or more branches within the TM transaction based on one or more transaction indicators stored in the branch trace buffer.

13. The method of claim 12, further comprising identifying one or more branches taken during a region of the TM transaction that aborted based on one or more abort indicators stored in the branch trace buffer.

14. The method of claim 13, further comprising optimizing code of the region based on the identification of the branches taken.

15. A system comprising:
a processor including an execution unit and a plurality of last branch record (LBR) register pairs each to store source and destination address information of a branch taken during program execution, each of the LBR register pairs further including a transaction indicator to indicate whether the branch was taken during a transactional memory (TM) transaction and an abort indicator to indicate whether an abort of the TM transaction occurred prior to when the branch was taken; and
a dynamic random access memory (DRAM) coupled to the processor.

16. The system of claim 15, wherein the processor includes hardware support for the TM transaction.

17. The system of claim 16, wherein the hardware support includes a cache memory having a plurality of entries each to store transaction metadata with regard to the TM transaction.

18. The system of claim 15, wherein the processor further includes logic to store the source and destination address information, the transaction indicator and the abort indicator into the plurality of LBR register pairs.

19. The system of claim 15, wherein the processor further includes an abort transaction register to store first address information of an instruction that causes the TM transaction to abort, and second address information of a handler to receive control responsive to the abort.

20. The system of claim 15, wherein the processor further includes a cache memory to store a branch trace buffer (BTB) for storage of information from the plurality of LBR register pairs.

21. The system of claim 20, further comprising logic to issue a signal to the plurality of LBR register pairs to cause contents of the plurality of LBR register pairs to be written into the BTB.

22. The system of claim 15, further comprising an optimizer to use an execution back trace for the TM transaction obtained based at least in part on the information stored in the LBR register pairs.

* * * * *